(12) United States Patent
Pietro et al.

(10) Patent No.: US 8,810,555 B2
(45) Date of Patent: Aug. 19, 2014

(54) METHOD AND APPARATUS FOR DRIVING AN ELECTROLUMINESCENT DISPLAY

(75) Inventors: William Joseph Pietro, Toronto (CA); Scott Stephen Fielder, Toronto (CA)

(73) Assignee: Scobil Industries Corp., Toronto, Ontario ( * ) Notice: Subject to any disclaimer, the term of this patent is extended or adjusted under 35 U.S.C. 154(b) by 0 days.

(21) Appl. No.: 13/409,656

(22) Filed: Mar. 1, 2012

(65) Prior Publication Data
US 2012/0249505 A1 Oct. 4, 2012

Related U.S. Application Data

(63) Continuation of application No. PCT/CA2010/001293, filed on Aug. 23, 2010.

(60) Provisional application No. 61/239,216, filed on Sep. 2, 2009.

(51) Int. Cl.
G09G 3/04 (2006.01)

(52) U.S. Cl.
USPC ............ 345/208; 345/76; 345/77; 345/78; 345/79; 345/80; 345/81; 345/82; 345/83; 313/500; 315/169.1; 315/169.2; 315/169.3; 315/169.4

(58) Field of Classification Search
USPC .............................. 345/76–83, 107, 204–210
See application file for complete search history.

(56) References Cited

U.S. PATENT DOCUMENTS

| | | | |
|---|---|---|---|
| 3,629,653 A | 12/1971 | Munt | |
| 3,975,661 A | 8/1976 | Kanatani et al. | |
| 4,467,325 A | 8/1984 | Lustig | |
| 4,847,609 A | 7/1989 | Kuwata et al. | |
| 5,315,311 A | 5/1994 | Honkala | |
| 5,736,973 A | 4/1998 | Godfrey et al. | |
| 6,191,535 B1 | 2/2001 | Saitou | |
| 6,384,806 B1 | 5/2002 | Matsueda | |
| 6,541,921 B1 | 4/2003 | Luciano, Jr. et al. | |
| 7,286,104 B2 | 10/2007 | Sempel et al. | |
| 2003/0034939 A1* | 2/2003 | Moon | 345/76 |

(Continued)

FOREIGN PATENT DOCUMENTS

| | | |
|---|---|---|
| CN | 1339772 A | 3/2002 |
| EP | 595792 A2 | 5/1994 |

(Continued)

OTHER PUBLICATIONS

Kang, Hao et al. "Electroluminescence Gray Scale Display Driving Method and Circuit" Semiconductor Photonics and Technology; 2007 13(3).

(Continued)

*Primary Examiner* — Joe H Cheng
*Assistant Examiner* — Lisa Landis
(74) *Attorney, Agent, or Firm* — Bereskin & Parr LLP/S.E.N.C.R., s.r.l.

(57) ABSTRACT

Method, apparatus and systems for driving electroluminescent segments in electroluminescent displays are disclosed. Each segment in the display receives a series of first pulses alternating in polarity at a first electrode and a series of second pulses at a second electrode. Each of the second pulses corresponds to one of the first pulses and is opposite in polarity. The width of the second pulses corresponds to the parasitic resistance of the segment.

20 Claims, 11 Drawing Sheets

(56) References Cited

U.S. PATENT DOCUMENTS

| | | |
|---|---|---|
| 2003/0043131 A1 | 3/2003 | Iguchi |
| 2004/0113868 A1 | 6/2004 | Wong et al. |
| 2007/0080905 A1 | 4/2007 | Takahara |
| 2008/0309593 A1* | 12/2008 | Ito et al. .................. 345/76 |

FOREIGN PATENT DOCUMENTS

| | | |
|---|---|---|
| EP | 0639937 A2 | 2/1995 |
| EP | 0837443 A1 | 4/1998 |
| EP | 1267319 | 12/2002 |
| EP | 1465144 A2 | 10/2004 |
| GB | 2405023 | 2/2005 |
| JP | 2000235370 A | 8/2000 |
| KR | 2094601 A | 12/2002 |
| KR | 5099112 A | 10/2005 |
| WO | 9846048 A1 | 4/1998 |
| WO | 2007055519 A1 | 5/2007 |

OTHER PUBLICATIONS

Johnston, Duncan et al. "Passive Multiplexing of Printed Electroluminescent Displays" a preview of the papers appearing in the Jun. 2005 issue of the Journal of the SID, available on-line at www.SID.org.

Doll, Walter, et al "An Integrated DC-To-AC Converter for Electroluminescent Displays, Proceedings of the 2000 Third IEEE International Caracas Conference on Devices, Circuits and Systems", 2000.

Rogers Corporation "D306A Electroluminescent Lamp Driver with Microcontroller"Internet Article <http://www.rogerscorp.com/durel/producttypes/2/Backlight-IC-Driver-Technology.aspx>.

Densitron "Dot Matrix LCD Character Modules" Internet Article <www.datsi.fi.upm.es/docencia/Micro_C/lcd/appnotes.pdf>.

Stein, Isidore H. "Electroluminescent Response to Pulse Excitation" Defence Technical Information Center, Apr. 1964. Internet Article <http://oai.dtic.mil/oai/oai?verb=getRecord&metadataPrefix=html&identifier=AD0601049>.

De Vos, J et al. "High-voltage CdSe-Ge TFT driver circuits for passive AC-TFELdisplays" Journal of Solid-State Circuits, vol. 34, Issue 2, Feb. 1999.

Jensen, Don "Implementing dc/ac inverters in liquid-crystal and EL displays" Electronic Engineer Master, Internet Article <http://www2.electronicproducts.com/Implementing_dc_ac_inverters_in_liquid_crystal_and_EL_displays-article-FEBERG1-FEB2001-html.aspx>.

OKI Semiconductor Europe GmbH "Organic Light-Emitting Diode (OLED) Display Drivers" Internet Article, 2008.

International Search Report mailed Dec. 6, 2010, International Patent Application No. PCT/CA2010/001293.

International Preliminary Report on Patentability and Written Opinion issued Mar. 6, 2012, International Patent Application No. PCT/CA2010/001293.

Extended European Search Report dated Aug. 29, 2013, EP Application No. 10813189.7.

Response to Extended European Search Report dated Mar. 11, 2014, EP Application No. 10813189.7.

* cited by examiner

METHOD AND APPARATUS FOR DRIVING AN ELECTROLUMINESCENT DISPLAY

CROSS REFERENCE TO RELATED APPLICATIONS

This application is a continuation of International patent application no. PCT/CA2010/001293, filed on Aug. 23, 2010, which claims priority from U.S. provisional patent application No. 61/239,216, filed on Sep. 2, 2009; the contents of which are both incorporated herein by reference.

FIELD

The described embodiments relate to electroluminescent displays. More particularly, the described embodiments relate to methods and apparatus for driving electroluminescent displays.

BACKGROUND

Illuminated displays can be a popular way of marketing or advertising. Traditionally, such illuminated displays may employ fluorescent lighting or other forms of light emitting bulbs or tubes as a light source.

More recently, it has become possible to generate light from a flat luminescent substrate in response to electrical stimulation of the substrate. This effect can be used to create an electroluminescent display. However, it is generally believed in the art that electroluminescent displays containing large electroluminescent segments are impractical and difficult to produce due to the unusually large amounts of power they require, with ever-reducing luminescent output.

It is desired to address or ameliorate one or more shortcomings or disadvantages associated with existing illuminated displays and/or methods for driving such displays, or to at least to provide a useful alternative thereto.

SUMMARY

In one broad aspect, there is provided a method of driving an electroluminescent segment, the electroluminescent segment comprising a phosphor layer disposed between a first electrode and a second electrode, the electroluminescent segment being associated with a parasitic resistance. The method includes applying a series of first pulses to the first electrode, the first pulses alternating in polarity; and applying a series of second pulses to the second electrode for illuminating the electroluminescent segment, each of the second pulses corresponding to a first pulse and having an opposite polarity to the corresponding first pulse, the width of each of the second pulses being based on the parasitic resistance associated with the electroluminescent segment.

In some embodiments, the series of first pulses form a square waveform.

In other embodiments, each of the first pulses forms a ramping waveform, and the first pulses alternate between ascending ramps and descending ramps. In some embodiments, each of the second pulses are aligned with a specific ramp level of the corresponding first pulse to illuminate the electroluminescent segment at a predetermined brightness.

In some embodiments, the width of each of the first pulses is the same as the width of the corresponding second pulse.

In some embodiments, each of the second pulses discharges and re-charges the electroluminescent segment.

In some embodiments the width of each of the second pulses controls the charge time of the electroluminescent segment, the maximum charge time be equal to the following equation wherein γ is the electric permittivity of the electroluminescent segment, A is the area of the electroluminescent segment, ρ is the electrical resistivity of the electroluminescent segment and Rp is the parasitic resistance.

$$\frac{3\gamma A}{\rho A + R_p}$$

In some embodiments, the parasitic resistance comprises current resistance, segment lead resistance, and cable resistance.

In another broad aspect, there is provided an apparatus for driving an electroluminescent segment, the electroluminescent segment comprising a phosphor layer disposed between a first electrode and a second electrode, the electroluminescent segment being associated with a parasitic resistance. The apparatus includes a first drive circuit for applying a series of first pulses to the first electrode, the first pulses alternating in polarity; and a second drive circuit for applying a series of second pulses to the second electrode for illuminating the electroluminescent segment, each of the second pulses corresponding to one of the first pulses and having an opposite polarity to the corresponding first pulse, the width of the second pulses being based on the parasitic resistance associated with the electroluminescent segment.

In some embodiments, the series of first pulses form a square waveform.

In other embodiments, the first pulses form a ramping waveform, and the first pulses alternate between ascending ramping waveforms and descending ramping waveforms. In some embodiments, the second drive circuit aligns each of the second pulses with a specific ramp level of the corresponding first pulse in accordance with a dimming control signal, and the apparatus further comprises a control unit for generating the dimming control signal.

In some embodiments, the width of the second pulses are varied by the second drive circuit in accordance with a pulse width control signal; and the apparatus further comprises a control circuit for generating the pulse width control signal.

In some embodiments, the width of each of the second pulses controls the brightness of the illumination of the electroluminescent segment.

In some embodiments, the second drive circuit provides a current spike to the second electrode during a first portion of each second pulse and provides a constant current to the second electrode during a second portion of each second pulse.

In some embodiments, the width of each of the first pulses is the same as the width of the corresponding second pulse.

In another broad aspect, there is provided an electroluminescent display. The electroluminescent display includes a plurality of electroluminescent segments, each electroluminescent segment comprising a phosphor layer disposed between a first electrode and a second electrode, each electroluminescent segment being associated with a parasitic resistance; a plurality of first drive circuits, each first drive circuit coupled to one of the plurality of first electrodes, each first drive circuit applying a series of first pulses to the corresponding first electrode, the first pulses alternating in polarity; and a plurality of second drive circuits, each second drive circuit coupled to one of the plurality of second electrodes, each second drive circuit applying a series of second pulses to the corresponding second electrode for illuminating the corresponding electroluminescent segment, each of the second pulses corresponding to one of the first pulses and having an opposite polarity to the corresponding first pulse, the width of the second pulses being based on the parasitic resistance associated with the corresponding electroluminescent segment.

In some embodiments, the electroluminescent display also includes a control unit for generating a plurality of pulse width control signals, wherein each of the second drive circuits varies the width of the corresponding second pulses in accordance with one of the pulse width control signals.

In some embodiments, the width of each series of second pulses controls the brightness of the illumination of the corresponding electroluminescent segment.

In another broad aspect, there is provided an electroluminescent display. The electroluminescent display includes: a common electrode; a plurality of electroluminescent segments mounted on the common electrode, each segment comprising a segment electrode and a phosphor layer disposed between the common electrode and the segment electrode, each electroluminescent segment being associated with a parasitic resistance; a first drive circuit coupled to the common electrode, the first drive circuit applying a series of first pulses to the common electrode, the first pulses alternating in polarity; and a plurality of second drive circuits, each second drive circuit coupled to one of the plurality of second electrodes, each second drive circuit applying a series of second pulses to the corresponding second electrode for illuminating the corresponding electroluminescent segment, each of the second pulses corresponding to one of the first pulses and having an opposite polarity to the corresponding first pulse, the width of the second pulses being based on the parasitic resistance associated with the corresponding electroluminescent segment.

In another broad aspect, there is provided a method of driving an electroluminescent segment, the electroluminescent segment comprising a phosphor layer disposed between first and second electrodes. The method includes measuring intrinsic properties of the electroluminescent segment; measuring parasitic resistance associated with the electroluminescent segment; calculating a charge time for the electroluminescent segment based on the intrinsic properties and the parasitic resistance; storing the calculated charge time in memory; applying a series of first pulses to the first electrode, the first pulses alternating in polarity; and applying a series of second pulses to the second electrode for illuminating the electroluminescent segment, each second pulse corresponding to one of the first pulses and having an opposite polarity to the corresponding first pulse, the width of the second pulses being based on the stored charge time.

BRIEF DESCRIPTION OF THE DRAWINGS

A preferred embodiment of the present invention will now be described in detail with reference to the drawings, in which.

DESCRIPTION OF EXEMPLARY EMBODIMENTS

Some of the embodiments described herein relate to methods and apparatus for driving an electroluminescent display in a manner in which the power required is reduced. In some embodiments, the brightness of the display may be varied in a controlled manner.

An electroluminescent display emits light in response to the application of a high-frequency voltage. An electroluminescent display may be divided into a number of electroluminescent segments that can be individually illuminated. Optionally, the electroluminescent segments may be arranged to form a matrix or grid. In other embodiments, the electroluminescent segments may have other shapes and arrangements.

Each electroluminescent segment typically comprises an electroluminescent substance (i.e. a phosphor substance) disposed between two electrodes. In some cases, one of the electrodes is common to some or all electroluminescent segments in a display. In other cases, the electrodes of each electroluminescent segment are electrically isolated from those of other segments. Application of a sufficiently high frequency alternating current (AC) voltage across the electrodes of an electroluminescent segment will produce electroluminescence or illumination of the segment.

Figure 1:
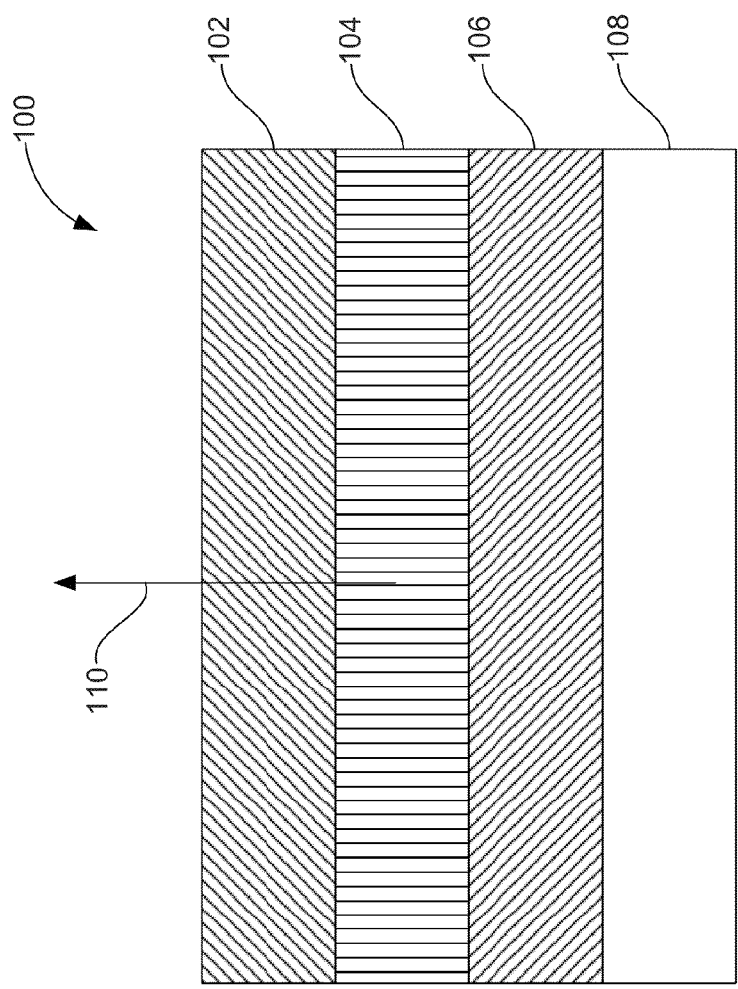
FIG. 1 is a side view of an electroluminescent segment in accordance with an embodiment.

Reference is now made to FIG. 1, in which an exemplary electroluminescent segment 100 is illustrated. The electroluminescent segment 100 comprises a number of parallel layers 102, 104, 106, and 108. In the embodiment shown in FIG. 1, the electroluminescent segment 100 is comprised of four layers, a front electrode layer 102, an electroluminescent layer 104, a dielectric layer 106 and a rear electrode layer 108. When a voltage is applied across the front and rear electrode layers 102 and 108, the electroluminescent layer 104 is activated and emits light in the direction indicated by arrow 110.

The front electrode layer 102 is comprised of an optically transparent and electrically conductive material such as indium-tin-oxide (ITO).

The electroluminescent layer 104 is formed on the front electrode layer 102. The electroluminescent layer 104 may be made of any suitable phosphor such as copper activated zinc sulfide (ZnS), or manganese (Mn) activated zinc sulfide (ZnS). In some cases, the electroluminescent layer 104 is 20-micron thick zinc sulfide (ZnS) doped with a small amount of copper ($CU^{2+}$) ions.

After the electroluminescent layer 104 is the dielectric layer 106. The dielectric layer 106 may be comprised of electrically insulating material that provides a barrier to the flow of electronics. Suitable insulating material includes conventional dielectric powder, such as white dielectric powder, in a suitable binder. In one embodiment, the dielectric layer 106 is 33-micron thick barium titanate (BaTiO$_3$).

The rear electrode layer 108 is formed on the dielectric layer 106 and may be comprised of any suitable electrically conductive material. The rear electrode layer 108 may be comprised of the same material as the front electrode layer 102, such as ITO, or different material. For example, the rear electrode layer 108 may be comprised of a suitable opaque material such as silver (Ag), gold (Au) or graphite-based material. In some cases, the rear electrode 108 is silver (Ag).

In some cases, the electroluminescent segment 100 may comprise additional layers. For example, the electroluminescent segment 100 may further comprise an encapsulation layer that acts as a water barrier to protect the electroluminescent layer 104 from atmospheric moisture. The electroluminescent segment 100 may also include a substrate upon which the layers are formed. The substrate may be comprised of any suitable transparent or translucent material, such as glass or plastic. The substrate may be rigid or flexible.

The electroluminescent segment 100 acts as a photoemissive capacitor. Specifically, the electroluminescent segment 100 is charged to a predetermined voltage (e.g. 160 V) which generates an electric field (e.g. 2.5×106 Vm$^{-2}$). The externally applied electric field is then suddenly reversed, thereby discharging the electroluminescent segment 100 and recharging it with the opposite polarity. During the repolarization, the electrons in the semiconductive electroluminescent layer 104 (e.g. the zinc sulfide (ZnS) layer) collide with the dopant ions (e.g. the copper (CU2$^+$) ions) with sufficient energy to ionize them. The ionized impurity extracts an electron from the conduction band of the electroluminescent layer 104 (e.g. the zinc sulfide (ZnS) layer) putting it in a metastable electronically excited state, which subsequently relaxes to the ground state photoemmissively. Accordingly, current is passed and light is emitted only during the repolarization periods, which typically only last a few microseconds.

Figure 2:
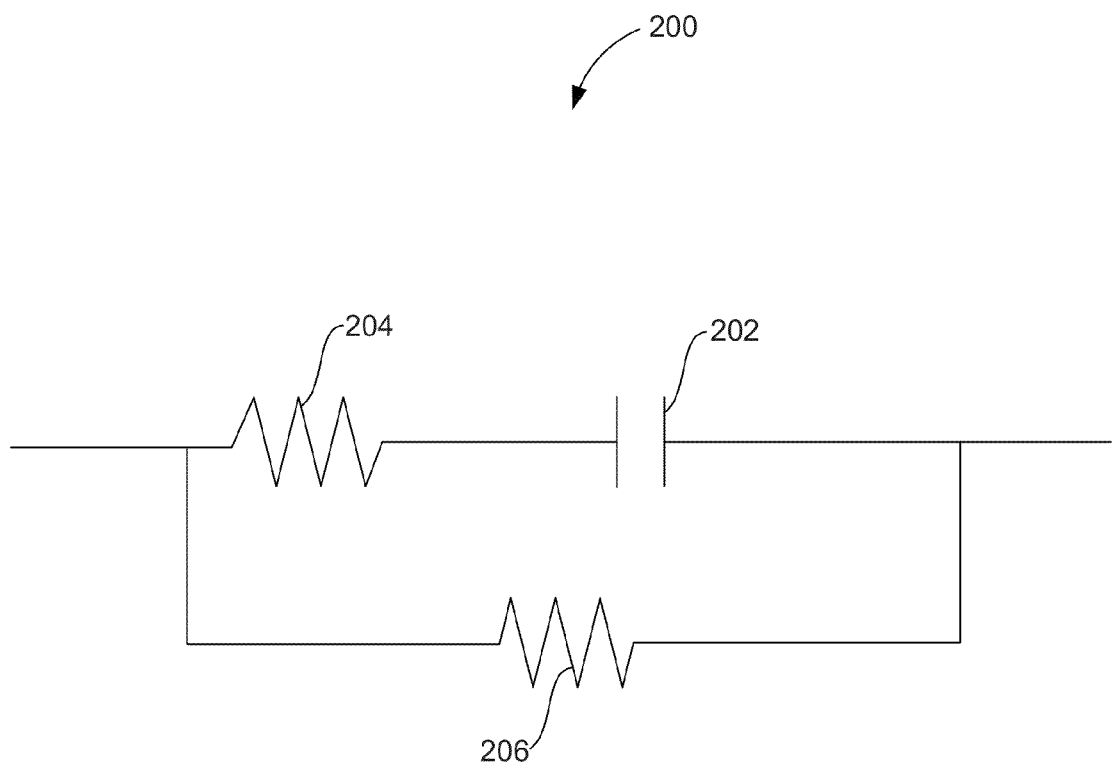
FIG. 2 is a circuit diagram of an impedance network that models the electroluminescent segment of FIG. 1.

Reference is now made to FIG. 2, which illustrates an impedance network 200 that can be used to model the electroluminescent segment 100. The impedance network 200 comprises a capacitor 202, a first resistor 204 and a second resistor 206. The capacitor 202 represents the capacitance of the electroluminescent segment 100, the first resistor 204 represents the resistance of the electroluminescent segment 100, and the second resistor 206 represents the resistance of the DC leakage paths through the capacitor 202. The capacitance $C_{202}$ of the capacitor 202 and the resistances $R_{204}$ and $R_{206}$ of the first and second resistors 204 and 206 respectively, can be represented by the intrinsic properties of the electroluminescent segment 100 as is shown in equation (1) where A is the area of the electroluminescent segment, $\gamma$ is the electric permittivity of the electroluminescent segment, and $\rho$ is the electrical resistivity of the electroluminescent segment.

$$C_{302} = \gamma A \qquad (1)$$
$$R_{304} = \frac{\rho}{A}$$
$$R_{306} = \frac{\rho_{306}}{A}$$

Typically the second resistor 206 is insignificant and thus can be ignored. If the second resistor 206 is ignored, the relaxation time $\tau$ of the circuit can be represented by equation (2). It can be seen from equation (2) that the relaxation time $\tau$ is dependent only on the intrinsic properties of the electroluminescent segment, and not on extrinsic factors such as the size (area) or geometry of the electroluminescent segment.

$$\tau = R_{204} C_{202} = \frac{\rho}{A}(\gamma A) = \rho \gamma \qquad (2)$$

The electroluminescent segment 100 may be illuminated by a driving circuit or apparatus that supplies a series of alternating positive and negative pulses to the electrodes of the electroluminescent segment 100. Each pulse causes a discharge and subsequent recharge of the capacitor 202. As described above, it is the discharge that triggers illumination of the electroluminescent segment 100. One cycle comprises both a positive and negative pulse and each half cycle comprises a single negative or positive pulse. The rate at which a cycle repeats is referred to as the frequency f.

The electroluminescent segment 100 presents a complex impedance to the driving circuit, and like any complex impedance, energy is consumed only by the real component. In addition, the energy required to charge the capacitor 202 does not contribute to the power dissipation, and is returned during the subsequent half cycle. Accordingly, the power dissipation P(t) of an electroluminescent segment 100 is given by equation (3), and the energy $E_C$ consumed by the electroluminescent segment during each half cycle is given by equation (4) where i(t) is the current flowing across the electroluminescent segment 100. The current i(t) can be represented by equation (5) where $V_0$ is the maximum voltage of the driving pulses.

$$P(t) = i^2(t) R_{204} \qquad (3)$$

$$E_C = R_{204} \int i^2 dt \qquad (4)$$

$$i(t) = \frac{V_0}{R_{204}} e^{\frac{-t}{R_{204} C_{202}}} \qquad (5)$$

The integration is taken over the entire half cycle, which is typically much longer than the relaxation time $\tau$ of equation (2). Accordingly, the integral is taken from zero to infinity so that the energy consumed by the electroluminescent segment 100 during each half cycle is reduced to equation (6). Since there are two pulses per cycle, the total power dissipation per cycle is represented by equation (7).

$$E_C = \frac{C_{202} V_0^2}{2} \qquad (6)$$

$$P = 2 f E_C = f C_{202} V_0^2 \qquad (7)$$

An examination of equation (7) reveals that the total power dissipation P is independent of the resistance in the circuit, even though the resistance is the dissipative element. The total resistance in the circuit typically includes not only the intrinsic resistance $R_{204}$ of the electroluminescent segment 100 itself, but also the parasitic resistance $R_\rho$ in the circuit. The parasitic resistance $R_\rho$ is defined as the sum of the resistances introduced in the cables, backplane and screen printed electrodes. Accordingly, the efficiency of the electroluminescent segment 100 can be improved by decreasing the parasitic resistance $R_\rho$ without increasing the power consumption.

The power coefficient ∈ is defined as the percentage of the power delivered to the electroluminescent segment 100 (i.e. the intrinsic resistance $R_{204}$) as opposed to the parasitic resistance $R_p$ and is represented by equation (8). Equation (8) can be re-written in terms of the intrinsic properties of the electroluminescent segment 100 as shown in equation (9).

$$\varepsilon = \frac{R_{204}}{R_p + R_{204}} \quad (8)$$

$$\varepsilon = \frac{\rho}{\rho + AR_p} \quad (9)$$

An examination of equation (9) reveals that when the parasitic resistance $R_p$ is zero, the power coefficient ∈ is equal to 1 and maximum power is delivered to the electroluminescent segment 100. Where, however, the parasitic resistance $R_p$ is greater than zero, the power coefficient ∈ and thus the efficiency of the electroluminescent segment 100 decreases with the increasing electroluminescent segment area A. Accordingly, if the parasitic resistance $R_p$ is greater than zero, a larger (i.e. greater area) electroluminescent segment 100 will require more power to achieve the same level of luminescence. However, it will be illustrated below that the affect of the size (i.e. area) of the electroluminescent segment 100 on the power requirements can be significantly reduced by carefully choosing the driving pulse profiles.

The power coefficient ∈ may be re-written in terms of the electroluminescent segment 100 capacitance $C_{202}$ instead of the electroluminescent segment area A as shown in equation (10).

$$\varepsilon = \frac{\gamma\rho}{(\gamma\rho + C_{202}R_p)} \quad (10)$$

When the power coefficient ∈ is equal to 1, the luminescent intensity I is directly proportional to the consumed power P as shown in equation (11), where κ is defined as the luminescent efficiency coefficient. Where, however, the power coefficient ∈ is greater than 1, the luminescent intensity I is reduced in accordance with the power coefficient ∈ as shown in equation (12).

$$I = \kappa P \quad (11)$$

$$I = \kappa \in P \quad (12)$$

Equation (12) can be rearranged so that the luminescent efficiency coefficient is represented by equation (13).

$$\kappa = \frac{I(\gamma\rho + C_{202}R_p)}{f\rho V_0^2 \gamma C_{202}} \quad (13)$$

The luminescent output per unit of area I/A is given by equation (14). Equation (14) can then be rearranged as shown in equation (15) to give the luminescent intensity I.

$$\frac{I}{A} = fV_0^2 \gamma \kappa \varepsilon \quad (14)$$

$$I = fV_0^2 \gamma \kappa A \quad (15)$$

Accordingly, the luminescent characteristics of an electroluminescent segment 100, such as the luminescent efficiency coefficient κ and the power efficiency ∈, can be calculated from equations (13) and (10) respectively by measuring $R_p$ and $C_{202}$. Then the luminescent intensity I can be calculated from equation (15). The total power demand on the power supply can then be calculated from equation (16).

$$P = fV_0^2 \gamma A \quad (16)$$

Once $R_p$ and $C_{202}$ have been measured, the time required to charge the capacitor 202 can be calculated. Specifically, the time $t_c$ to charge the capacitor 202 to x % of the maximum voltage is expressed in equation (17). If it is assumed that the capacitor 202 is charged when it has reached 95% of its maximum voltage, equation (17) reduces to equation (18).

$$t_C = -(R_{204} + R_p)C_{202} \ln(1 - x/100) \quad (17)$$

$$t_c = -(R_{204} + R_p)C_{202} \ln(0.05) = 3(R_{204} + R_p)C_{202} = \frac{3\gamma A}{\rho A + R_p} \quad (18)$$

Figure 3:
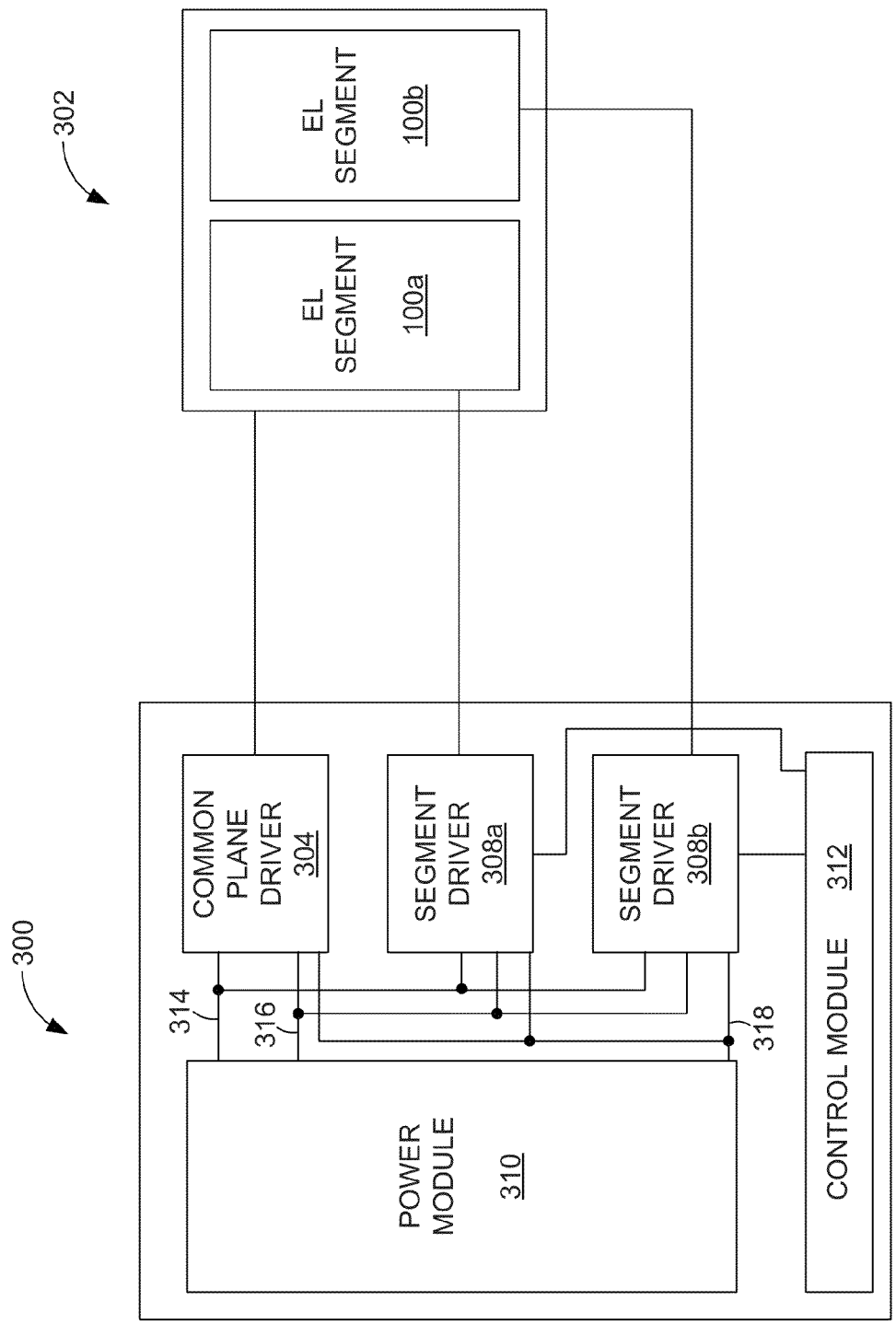
FIG. 3 is a block diagram of an apparatus for driving an electroluminescent display in accordance with an embodiment.

Reference is now made to FIG. 3, in which an apparatus 300 for driving an electroluminescent display 302 in accordance with an embodiment is illustrated. The apparatus 300 is designed to take advantage of the observations made by the inventors as described above. Particularly, the apparatus 300 is designed to take advantage of the relationship between the charge time $t_c$ and parasitic resistance $R_p$ to reduce the power consumption of the electroluminescent display 302.

The electroluminescent display 302 includes one or more electroluminescent segments 100a and 100b that are individually coupled to the apparatus 300. As described above, each electroluminescent segment 100a and 100b comprises an electroluminescent substance (i.e. phosphor substance) disposed between two electrodes. At least two of the electroluminescent segments 100a and 100b have a common electrode. In the embodiment shown in FIG. 3, all of the electroluminescent segments 100a and 100b share a common electrode. However, in other embodiments, there may be more than one common electrode where each common electrode is shared by two or more electroluminescent segments. In some embodiments, the electroluminescent segments 100a and 100b are arranged to form a matrix or grid. In other embodiments, the electroluminescent segments 100a and 100b may have other shapes and arrangements.

The apparatus 300 comprises a common plane driver 304, one or more segment drivers 308a and 308b (typically one for each electroluminescent segment 100a and 100b), a power module 310 and a control unit 312. The common plane driver 304 and the segment drivers 308a and 308b work together to provide an AC voltage across one or more electroluminescent segments 100a and 100b to illuminate the one or more electroluminescent segments 100a and 100b. The common plane driver 304 may be a non-dimming common plane driver or a dimming common plane driver. A non-dimming common plane driver allows the electroluminescent segments to be either illuminated or not, whereas a dimming common plane driver allows the luminescence or brightness of the electroluminescent segments to be varied in a controlled manner.

Figure 4:
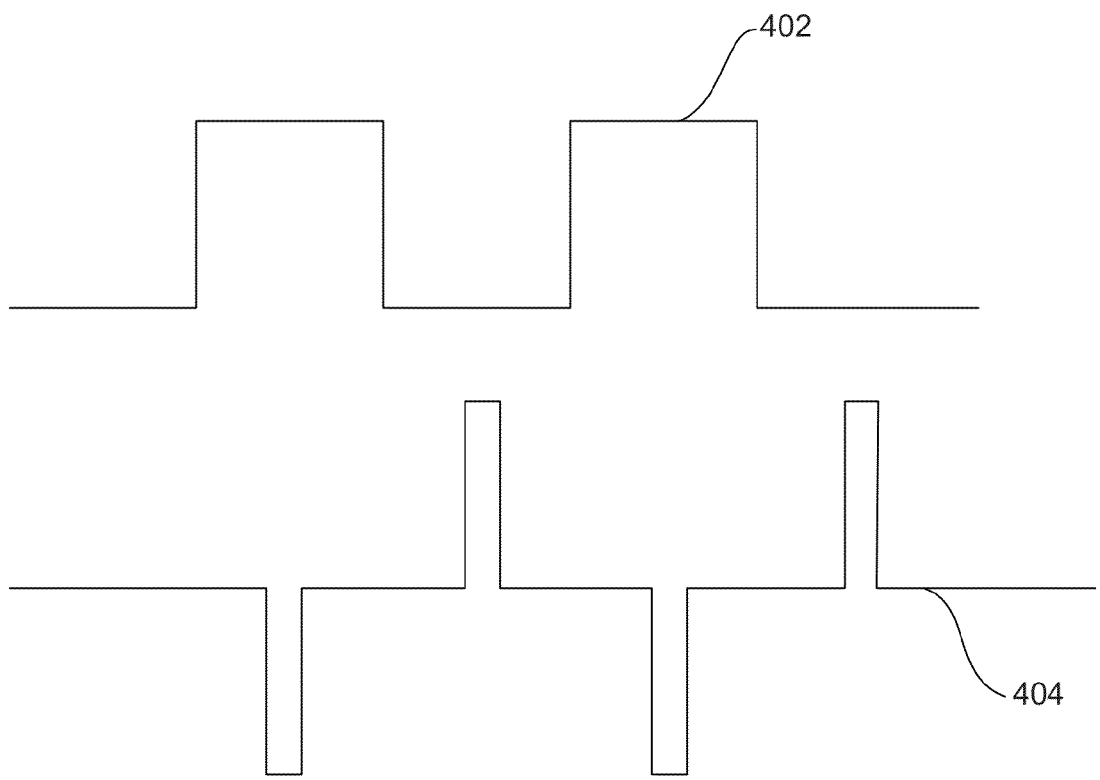
FIG. 4 is a schematic of the voltage waveforms generated by a dimming common plane driver and a segment driver in accordance with an embodiment.

For example, a non-dimming common plane driver may supply a series of pulses to the common electrode (i.e. the front electrode) of the one or more electroluminescent segments 100a and 100b. Each segment driver 308a and 308b then supplies a series of pulses of opposite polarity to the non-dimming common electrode pulses to the other electrode of one of the electroluminescent segments 100a or 100b. The width of the segment driver 308a or 308b pulses is typically smaller than the width of the non-dimming common plane driver pulses. Each segment driver pulse generates a voltage potential across the corresponding electroluminescent segment 100a or 100b, which causes a discharge and subsequent recharge of the electroluminescent segment 100a or 100b. Light is emitted during the discharge. An exemplary set of voltage waveforms generated by a non-dimming common plane driver and a segment driver 308a or 308b is illustrated in FIG. 4. An exemplary non-dimming common plane driver will be described in reference to FIG. 7.

Figure 5:
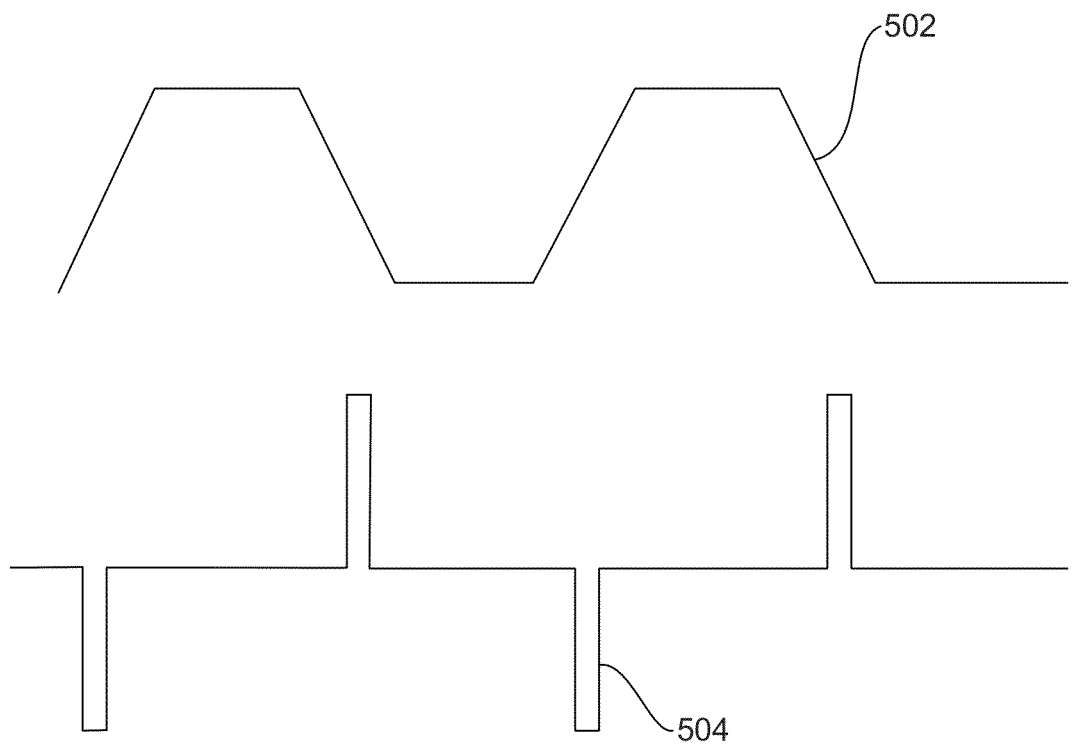
FIG. 5 is a schematic of the voltage waveforms generated by a non-dimming common plane driver and a segment driver in accordance with an embodiment.

A dimming common plane driver, on the other hand, may supply a series of upward (ascending) and downward (descending) voltage ramps to the common electrode (i.e. the front electrode) of the one or more electroluminescent segments 100a and 100b. Each segment driver 308a and 308b then supplies a series of pulses of opposite polarity to the direction of the ramp to the other electrode of one of the electroluminescent segments 100a or 100b. For example, if the dimming common plane driver ramp is an upward (or ascending) ramp, then the corresponding segment driver pulse will be negative, and if the ramp is a downward (or descending) ramp, then the corresponding segment driver pulse will be positive. The width of the segment driver 308a or 308b pulses is typically smaller than the width of the dimming common plane driver ramps. Each segment driver pulse generates a voltage potential across the corresponding electroluminescent segment 100a or 100b, which causes a quick discharge and a subsequent recharge of the electroluminescent segment 100a or 100b. The quick discharge results in illumination of the corresponding electroluminescent segment. The amount of illumination or brightness will depend on the voltage produced by the dimming common plane driver at the time the corresponding segment driver pulse is triggered. Specifically, the greater the difference between the segment driver pulse voltage and the dimming common plane driver ramp voltage, the greater the brightness. An exemplary set of voltage waveforms generated by a dimming common plane driver and a segment driver 308a or 308b is illustrated in FIG. 5. An exemplary dimming common plane driver will be described in reference to FIG. 6.

The power module 310 is electrically coupled or connected to the common plane and segment drivers 304, 308a and 308b to provide power to the drivers 308a and 308b. In one embodiment, the power module 310 generates and provides three DC voltages 314, 316 and 318 to the drivers. The first DC voltage 314 will be referred to as the positive voltage rail and controls the maximum voltage of the common plane and segment driver pulses and ramps. The second DC voltage 316 will be referred to as the negative voltage rail and controls the minimum voltage of the common plane and segment driver pulses and ramps. The third DC voltage 318 will be referred to as the digital voltage signal and provides power to various electrical components within the common plane and segment drivers. In other embodiments, the power module 310 may provide other voltages.

The control unit 312 is electrically coupled or connected to the segment drivers 308a and 308b to provide timing information to the segment drivers 308a and 308b. The control unit 312 may, for example, comprise a memory or other similar storage device that stores a sequence of commands to control the illumination of the electroluminescent segments 100a and 100b. The sequence of commands may include which of the electroluminescent segments to illuminate when, for how long, and at what brightness.

In one embodiment, the control unit 312 generates high and low control signals for each segment driver 308a and 308b which control the timing or width, or both, of the pulses generated by the segment drivers 308a and 308b. Where the high and low control signals are used to control the timing of the pulses generated by the segment drivers 308a and 308b to align them with a certain ramp level of the ramping waveform generated by a dimming common plane driver, the high and low control signals may be referred to as dimming control signals. Where the high and low control signals are used to control the width of the pulses generated by the segment drivers 308a and 308b the high and low control signals may be referred to as pulse width control signals.

An examination of equation (9) reveals that when the parasitic resistance $R_\rho$ is zero, the power coefficient $\in$ is equal to 1 and maximum power is delivered to the electroluminescent segment 100. Where, however, the parasitic resistance $R_\rho$ is greater than zero, the power coefficient $\in$ and thus the efficiency of the electroluminescent segment 100 decreases with the increasing electroluminescent segment area A. Accordingly, if the parasitic resistance $R_\rho$ is greater than zero, a larger (i.e. greater area) electroluminescent segment 100 will require more power to achieve the same level of luminescence. However, it will be illustrated below that the effect of the size (i.e. area) of the electroluminescent segment 100 on the power requirements can be significantly reduced by carefully choosing the driving pulse profiles.

As described in equation (18), the charge time of an electroluminescent segment 100a or 100b is based on the parasitic resistance $R_\rho$ of the electroluminescent segment circuit. Since the width of the pulse determines the period of time voltage is supplied across the electroluminescent segment (and thus the time the electroluminescent segment is charged), the pulse width of the segment driver pulse is also dependent on the parasitic resistance $R_p$. Where the parasitic resistance $R_\rho$ is equal to zero, equation (18) reduces to $3\gamma/\rho$. Therefore the absolute minimum pulse width to achieve the maximum luminescence is $3\gamma/\rho$. Where, for example, $\gamma$ is equal to 490 pF/cm$^2$ and $\rho$ is equal to 930 $\Omega$/cm$^2$ the minimum width of the segment pulse to achieve the maximum luminescence is roughly 1.5 µs. Introducing parasitic resistance $R_p$ into the circuitry increases the charge time (and thus the pulse width) to achieve the maximum luminescence at a rate of $3\gamma R_p$ per unit area. Accordingly, if the parasitic resistance $R_p$ of the electroluminescent segment 100a or 100b is known, the charge time (and thus pulse width) to achieve the maximum luminescence can be determined from equation (18). If the pulse width (and thus charge time) is less than the pulse width calculated according to equation (18), the electroluminescent segment 100a or 100b will not achieve maximum luminescence. On the other hand, if the pulse width (and thus charge time) is greater than the pulse width calculated according to equation (18), power will be wasted.

Typically, each segment driver 308a or 308b that shares a particular common electrode triggers its pulses at different times during the cycle. For example, the pulses from the first segment driver 308a would typically not overlap in time with the pulses generated by the second segment driver 308b. Accordingly, the frequency of the square wave generated by the non-dimming common plane driver is typically selected to be long enough to allow each of the electroluminescent segments sharing a common electrode to be activated by a segment pulse during one half cycle.

Reference is now made to FIG. 5, which illustrates the waveforms 502 and 504 generated by a dimming common plane driver and a segment driver 308a or 308b, respectively. As can be seen from FIG. 5, a dimming common plane driver supplies a ramping waveform to the common electrode (i.e. the front electrode), and, similar to FIG. 4, the segment driver 308a or 308b supplies a series of opposite polarity pulses to the other electrode (i.e. the rear electrode) of one electroluminescent segment 100a or 100b. The segment driver pulses of FIG. 5 operate in the same manner as the segment driver pulses shown in FIG. 4. Specifically, each segment driver pulse generates a voltage potential across the corresponding electroluminescent segment, which causes a discharge and subsequent recharge of the electroluminescent segment 100a or 100b. Light is emitted by the corresponding electroluminescent segment 100a or 100b during the discharge. However, now the segment driver pulses can be fired at specific points along the ramp affording a continuum of light intensity.

Specifically, the brightness is determined by the difference between the segment driver pulse voltage and the dimming common plane driver ramp voltage. The greater the difference between the two voltages, the greater the brightness. Conversely the smaller the difference between the two voltages, the dimmer the illumination. Accordingly, the segment driver pulses can be triggered at different points along the ramp to either increase or decrease the difference between the voltages (and thus the brightness). The flat portions of the common plane waveform typically provide the greatest difference between the common plane driver ramp voltage and the segment driver pulse voltage and thus can be used to achieve maximum light intensity.

In one embodiment, such as the embodiment shown in FIG. 5, the segment drivers are configured to generate pulses that are opposite in polarity to the direction of the ramp. For example, when the common driver ramp is an upward or ascending ramp, the segment drivers generate negative pulses, and when the common driver ramp is a downward or descending ramp, the segment drivers are configured to generate positive pulses.

Therefore for an ascending ramp, the higher the voltage of the dimming common plane driver waveform at the time the segment driver pulse is triggered, the brighter the illumination. For example, if the segment driver pulse is triggered in the earlier part of the upward ramp (i.e. when the ramp voltage is lower), the intensity or brightness of the illumination of the corresponding electroluminescent segment will be lower. Conversely, if the segment driver pulse is triggered in the latter part of the upward ramp (i.e. when the ramp voltage is higher), the intensity or brightness of the illumination of the corresponding electroluminescent segment 100a or 100b will be higher. The converse is true for a descending ramp, the lower the voltage of the dimming common plane driver waveform at the time the segment driver pulse is triggered, the more dim the illumination.

Figure 6:
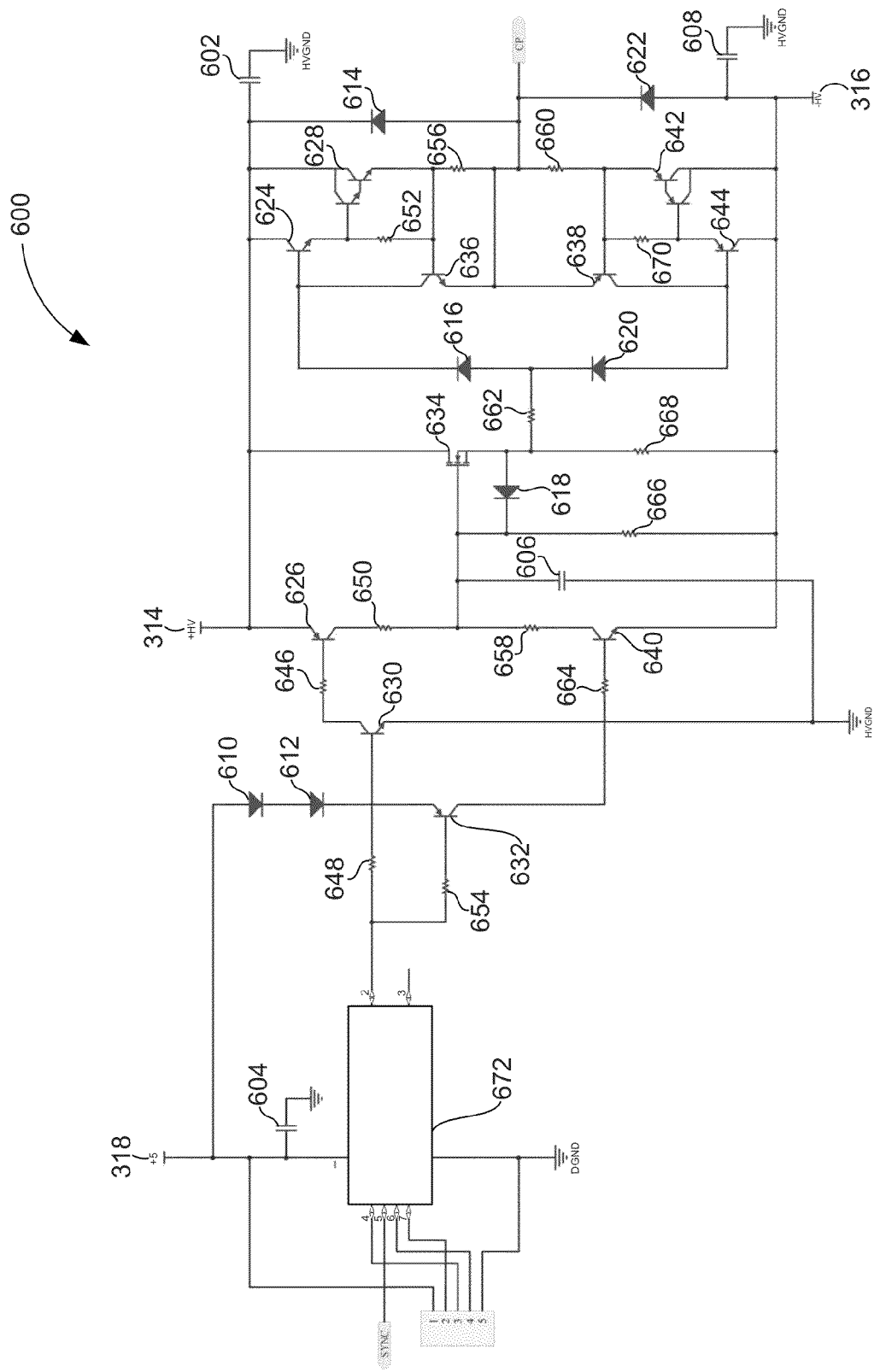
FIG. 6 is a circuit diagram of a dimming common plane driver in accordance with an embodiment.

Reference is now made to FIG. 6, in which a dimming common plane driver 600 in accordance with an exemplary embodiment is illustrated. The dimming common plane driver 600 receives three DC voltage signals (the positive voltage rail 314, the negative voltage rail 316 and a digital voltage signal 318) from the power module 310 and generates the ramping waveform 502 shown in FIG. 5. In the embodiment shown in FIG. 6, the dimming common plane driver 600 comprises four capacitors 602, 604, 606 and 608; seven diodes 610, 612, 614, 616, 618, 620 and 622; eleven transistors 624, 626, 628, 630, 632, 634, 636, 638, 640, 642 and 644; thirteen resistors 646, 648, 650, 652, 654, 656, 658, 660, 662, 664, 666, 668 and 670; and a sequencer 672.

The sequencer 672 controls the operation of the dimming common plane driver 600. More specifically, the sequencer 672 controls the timing (i.e. frequency) of the waveform generated by the dimming common plane driver 600. In one embodiment, the sequencer 672 is pre-loaded with the timing information. In other embodiments, the timing information is received dynamically from the control unit 312. The sequencer 672 may be implemented by a microcontroller, such as the PIC16F876 microcontroller.

At the beginning of each frequency cycle the sequencer 672 sets the bases of the fourth and fifth transistors 630 and 632 high. This drives the second and fourth transistors 626 and 628 into conduction, causing the third capacitor 606 to charge to the positive voltage rail 314 through the third resistor 650.

This generates the upward (or ascending) ramping portion of the waveform 502 shown in FIG. 5. The time constant $\tau$ of the RC circuit is equal to $R_{650}*C_{606}$ where $R_{650}$ is the resistance in ohms of the third resistor 650 and $C_{606}$ is the capacitance in Farads of the third capacitor 606. The time which is required to charge the capacitor to x % of its maximum voltage is expressed in equation (19).

$$T=\tau \ln(1-x/100) \qquad (19)$$

In some embodiments, the capacitor is deemed to be charged when it reaches 95% of its maximum voltage. This reduces equation (19) to $3\tau$. Thus the capacitor will be charged within 3 time constants. Firing the segment driver pulse anytime within this charging period will illuminate the corresponding electroluminescent segment 100a or 100b with varying intensities.

Typically, the segment drivers are configured to generate pulses that are opposite in polarity to the direction of the ramp generated by the dimming common plane driver. For example, the segment drivers may generate a negative pulse when the ramp is an upward or ascending ramp, and a positive pulse when the ramp is a downward or descending ramp. Accordingly, during the first frequency half cycle the higher the voltage of the dimming common plane driver waveform at the time the segment driver pulse is triggered, the brighter the illumination. For example, if the segment driver pulse is triggered in the earlier part of the upward ramp (i.e. when the ramp voltage is lower), the intensity or brightness of the illumination of the corresponding electroluminescent segment will be lower. Conversely, if the segment driver pulse is triggered in the latter part of the upward ramp (i.e. when the ramp voltage is higher), the intensity or brightness of the illumination of the corresponding electroluminescent segment 100a or 100b will be higher.

Once the third capacitor 606 has been charged to the positive voltage rail 314, the voltage is held constant. This will be referred to as the "flat period" of the first frequency half cycle. The maximum luminescence or brightness is achieved when the segment driver pulse is triggered during the "flat period."

At the end of the first frequency half cycle, the sequencer 672 drives the bases of the fourth and fifth transistors 630 and 632 low. This drives the ninth transistor 640 into conduction, causing the third capacitor 606 to charge to the negative voltage rail 316 through the seventh resistor 658. This generates the downward (or descending) ramping portion of the waveform shown in FIG. 5. The time constant $\tau$ of the RC circuit is equal to $R_{658}*C_{606}$ where $R_{658}$ is the resistance in ohms of the seventh resistor 658 and $C_{606}$ is the capacitance in Farads of the third capacitor 606. The time which is required to charge the capacitor to x % of its maximum charge is expressed in equation (19).

In some embodiments, the capacitor is deemed to be charged when it reaches 95% of its maximum charge. This reduces equation (19) to $3\tau$. Thus the capacitor will be charged within 3 time constants. Firing the segment driver pulse anytime within this charging period will illuminate the corresponding electroluminescent segment 100a or 100b with varying intensities.

As described above, the segment drivers may be configured to generate pulses that are opposite in polarity to the direction of the ramp. For example, the segment drivers may generate a negative pulse when the ramp is an upward or ascending ramp, and a positive pulse when the ramp is a downward or descending ramp. Accordingly, in the second half cycle, the lower the voltage of the dimming common plane driver at the time the segment driver pulse is triggered, the brighter the illumination. For example, if the segment driver pulse is triggered in the earlier part of the downward ramp (i.e. when the ramp voltage is higher), the intensity or brightness of the illumination of the corresponding electroluminescent segment will be lower. Conversely, if the segment driver pulse is triggered in the latter part of the downward ramp (i.e. when the ramp voltage is lower), the intensity or brightness of the illumination of the corresponding electroluminescent segment will be higher.

Once the third capacitor 606 has been charged to the negative voltage rail 316, the voltage is held constant. This will be referred to as the "flat period" of the second frequency half cycle. The maximum luminescence or brightness may be achieved when the segment driver pulse is triggered during the "flat period."

The complete ramping waveform 502 shown in FIG. 5 appears on the gate of the sixth transistor 634. The sixth transistor 634 is configured as a source follower and drives a voltage follower output stage comprising the first and third transistors 624 and 628 on the high side, and the tenth and eleventh transistors 642 and 644 on the low side.

The seventh and eighth transistors 636 and 638 and the sixth and eighth resistors 656 and 660 act as current limiters. Specifically, the seventh and eighth transistors 636 and 638 and the sixth and eighth resistors 656 and 660 limit the current flowing through the voltage follower output stage (e.g. first and third transistors 624 and 628 or tenth and eleventh transistors 642 and 644).

The third and seventh diodes 614 and 622 work in conjunction with the first and fourth capacitors 602 and 608 to shunt transient overvoltages caused by the voltage doubling effect of the corresponding electroluminescent segment 100a or 100b capacitive load during switching.

The first and second diodes 610 and 612 eliminate base leakage currents assuring definite cut-off of the fifth transistor 632.

The sequencer 672 may also generate one or more synchronization signals at a predetermined time before the start of each half cycle so that the segment drivers 308a and 308b can synchronize their pulses with the waveform generated by the dimming common plane driver 600. In some embodiments, the sequencer 672 generates two synchronization signals. The first synchronization signal is generated at a predetermined time prior to the start of the first half cycle, and the second synchronization signal is generated at a predetermined time prior to the start of the second half cycle. In other embodiments, the sequencer 672 may generate only a single synchronization signal which is used to carry the timing information for both half cycles. In some embodiments, the predetermined time is 10 μs. However, other suitable predetermined times may be used.

In one embodiment, the components of the dimming common plane driver 600 have the values and types as set out in Table 1.

TABLE 1

| Element | Type | Value/Part Number |
| --- | --- | --- |
| 602 | Capacitor | 0.1 F 100 V |
| 604 | Capacitor | 0.1 F |
| 606 | Capacitor | 560 pF |
| 608 | Capacitor | 0.1 F 100 V |
| 610 | 3 Amp Medium Power Silicon Rectifier Diode | 1N4148 |
| 612 | 3 Amp Medium Power Silicon Rectifier Diode | 1N4148 |
| 614 | 3 Amp Medium Power Silicon Rectifier Diode | RF071 |
| 616 | 3 Amp Medium Power Silicon Rectifier Diode | RF071 |
| 618 | 3 Amp Medium Power Silicon Rectifier Diode | RF071 |
| 620 | 3 Amp Medium Power Silicon Rectifier Diode | RF071 |
| 622 | 3 Amp Medium Power Silicon Rectifier Diode | RF071 |
| 624 | NPN Bipolar Transistor | MMST5551 |
| 626 | PNP Bipolar Transistor | MMST5401 |
| 628 | NPN Darlington Bipolar Transistor | 2SD1535 |
| 630 | NPN Bipolar Transistor | MMST5551 |
| 632 | PNP Bipolar Transistor | MMST5401 |
| 634 | N-Channel MOSFET | ZVN4424 |
| 636 | NPN Bipolar Transistor | MMST5551 |
| 638 | PNP Bipolar Transistor | MMST5401 |
| 640 | NPN Bipolar Transistor | MMST5551 |
| 642 | PNP Darlington Bipolar Transistor | FJPF9020 |
| 644 | PNP Bipolar Transistor | MMST5401 |
| 646 | Resistor | 75 KΩ |
| 648 | Resistor | 4.7 KΩ |
| 650 | Resistor | 150 KΩ |
| 652 | Resistor | 2.4 KΩ |
| 654 | Resistor | 4.7 KΩ |
| 656 | Resistor | 1R |
| 658 | Resistor | 150 KΩ |
| 660 | Resistor | 1R |
| 662 | Resistor | 75 KΩ |
| 664 | Resistor | 75 MΩ |
| 666 | Resistor | 2.2 MΩ |
| 668 | Resistor | 75 KΩ |
| 670 | Resistor | 2.4 KΩ |
| 670 | Sequencer | PIC12F629-I/SN |

Figure 7:
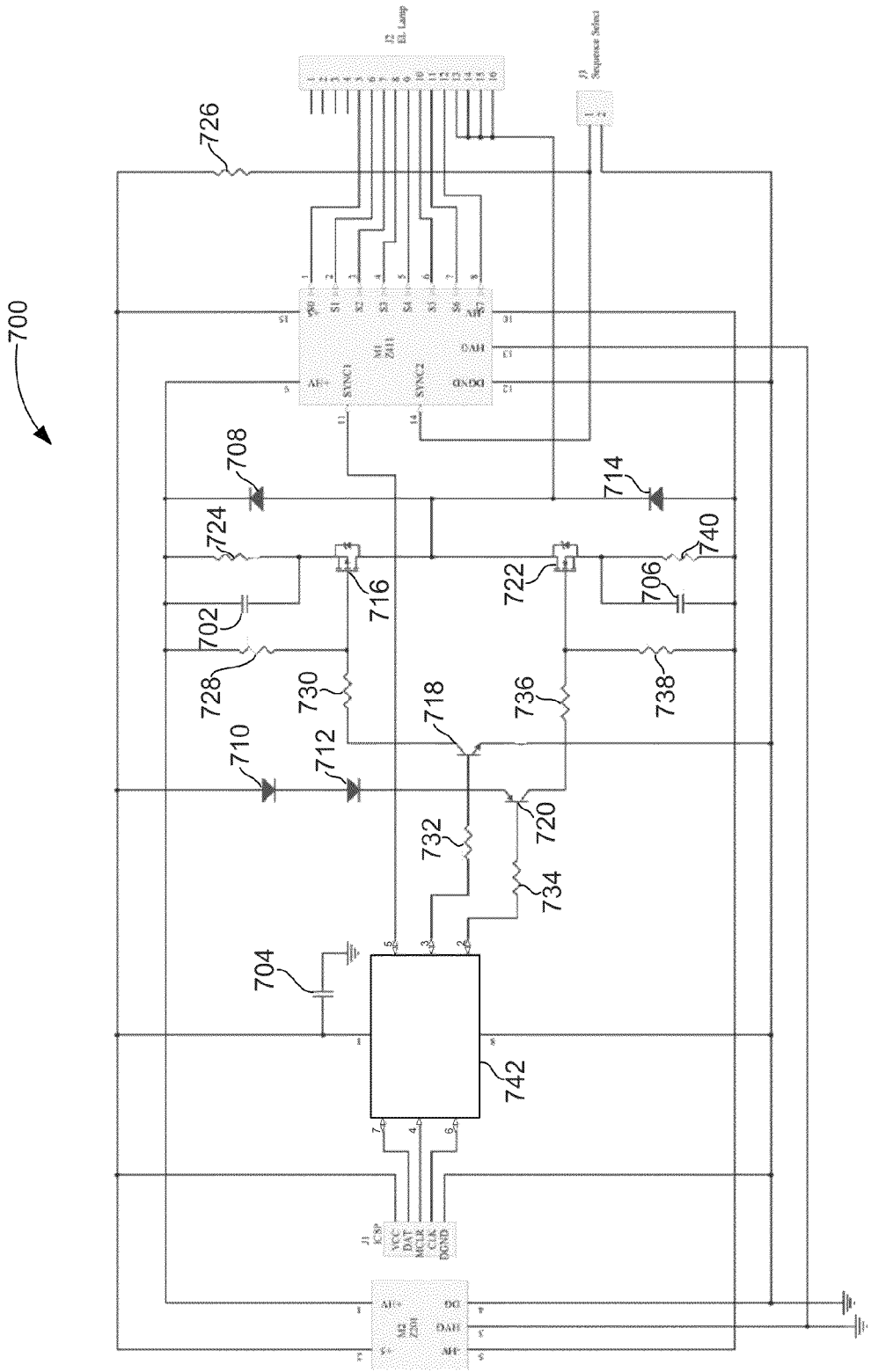
FIG. 7 is a circuit diagram of a non-dimming common plane driver in accordance with an embodiment.

Reference is now made to FIG. 7, in which a non-dimming common plane driver 700 in accordance with an embodiment is illustrated. The non-dimming common plane driver 700 receives three DC voltage signals (the positive voltage rail 314, the negative voltage rail 316 and a digital voltage signal 318) from the power module 310 and generates the square waveform 402 shown in FIG. 4. In the embodiment shown in FIG. 7, the non-dimming common plane driver 700 comprises three capacitors 702, 704 and 706; four diodes 708, 710, 712, and 714; four transistors 716, 718, 720 and 722; nine resistors 724, 726, 728, 730, 732, 734, 736, 738, and 740 and a sequencer 742.

The sequencer 742 controls the operation of the non-dimming common plane driver 700. More specifically, the sequencer 742 controls the timing (i.e. frequency) of the voltage waveform generated by the non-dimming common plane driver 700. In one embodiment, the sequencer 742 is pre-loaded with the timing information. In other embodiments, the sequencer 742 may receive the timing information dynamically from the control unit 312. The sequencer 742 may be implemented by a microcontroller, such as the PIC16F876 microcontroller.

At the beginning of each frequency cycle the sequencer 742 sets the base of the second transistor 718 high. The third and fourth resistors 728 and 730 form a resistive divider that raises the gate of the first transistor 716 to a percentage of the positive voltage rail 314. Specifically, the resistive divider raises the gate of the first transistor 716 to $R_{730}/(R_{728}+R_{730})$*Positive Voltage Rail 314 where $R_{728}$ is the resistance of the third resistor 728 and $R_{730}$ is the resistance of the fourth resistor 730. For example, where the third and fourth resistors 728 and 730 have resistances of 3.9 KΩ and 18 KΩ respectively and the positive voltage rail 314 is 80 V, the gate of first transistor 716 will be roughly 65 V, or 15 V below the positive voltage rail 314.

This drives the first transistor 716 into saturation with a light load. However, under heavy load conditions, the first transistor 716 acts as a source follower, preventing the voltage drop across the first resistor 724 from exceeding a predetermined voltage (i.e. 13V). Therefore, current through the first transistor's 716 drain is limited to the predetermined voltage/$R_{724}$ where $R_{724}$ is the resistance of the first resistor 724. For example, where the predetermined voltage is 13 V and the resistance $R_{724}$ of the first resistor 724 is 82Ω the current through the first transistor's 716 drain is limited to 13 V/82Ω or 160 mA. The first capacitor 702 allows instantaneous high current transients.

At the end of one frequency half cycle, the sequencer 742 drives the base of the third transistor 720 low. The seventh and eighth resistors 736 and 738 form a resistive divider that raises the gate of the fourth transistor 722 to a percentage of the negative voltage rail 316. Specifically, the resistive divider raises the gate of the first transistor 716 to $R_{736}/(R_{736}+R_{738})$*Negative Voltage Rail 316 where $R_{736}$ is the resistance of the seventh resistor 736 and $R_{738}$ is the resistance of the eighth resistor 738. For example, where the sixth and seventh resistors 736 and 738 have resistances of 18 KΩ and 3.9 KΩ respectively and the negative voltage rail is −80 V, the gate of fourth transistor 722 will be roughly −65 V, or 15 V above the negative voltage rail 316.

This drives the fourth transistor 722 into saturation with a light load. However, under heavy load conditions, the fourth transistor 722 acts as a source follower, preventing the voltage drop across the ninth resistor 740 from exceeding a predetermined voltage (i.e. 13V). Therefore, current through the fourth transistor's 722 drain is limited to the predetermined voltage/$R_{740}$ where $R_{740}$ is the resistance of the ninth resistor 740. For example, where the predetermined voltage is 13V and the resistance $R_{740}$ of the ninth resistor 740 is 82Ω the current through the fourth transistor's 722 drain is limited to 13V/82Ω or 160 mA. The third capacitor 706 allows instantaneous high current transients.

The sequencer 742 may also generate a synchronization signal a predetermined time before the start of each half cycle so that the segment driver can synchronize its pulses with those of the dimming common plane driver 700. In some embodiments, the sequencer 742 generates two synchronization signals. The first synchronization signal is generated at a predetermined time prior to the start of the first half cycle, and the second synchronization signal is generated at a predetermined time prior to the start of the second half cycle. In other embodiments, the sequencer 742 may generate only a single synchronization signal which is used to carry the timing information for both half cycles. In some embodiments, the predetermined time is 10 μs. However, other suitable predetermined times may be used.

In one embodiment, the components of the non-dimming common plane driver 700 have the values and types as set out in Table 2.

TABLE 2

| Element | Type | Value/Part Number |
|---|---|---|
| 702 | Capacitor | 0.68 F 100 V |
| 704 | Capacitor | 0.1 F |
| 706 | Capacitor | 0.68 F 100 V |
| 708 | High Voltage Fast Diode | FR071M2STR |
| 710 | High Conductance Fast Diode | 1N914 |
| 712 | High Conductance Fast Diode | 1N914 |
| 714 | High Voltage Fast Diode | FR071M2STR |
| 716 | HEXFET P-Channel Power MOSFET | IRF9620 |
| 718 | NPN Small Signal Transistor | MMST5551 |
| 720 | PNP Small Signal Transistor | MMST5401 |
| 722 | HEXFET P-Channel Power MOSFET | IRF720 |
| 724 | Resistor | 82R 0.5 W |
| 726 | Resistor | 10 KΩ |
| 728 | Resistor | 3.9 KΩ |
| 730 | Resistor | 18 KΩ |
| 732 | Resistor | 5.1 KΩ |
| 734 | Resistor | 5.1 KΩ |
| 736 | Resistor | 18 KΩ |
| 738 | Resistor | 3.9 KΩ |
| 740 | Resistor | 82R 0.5 W |
| 742 | FLASH-Based 8-bit CMOS Microcontroller | PIC12F629-I/SN |

Figure 8:
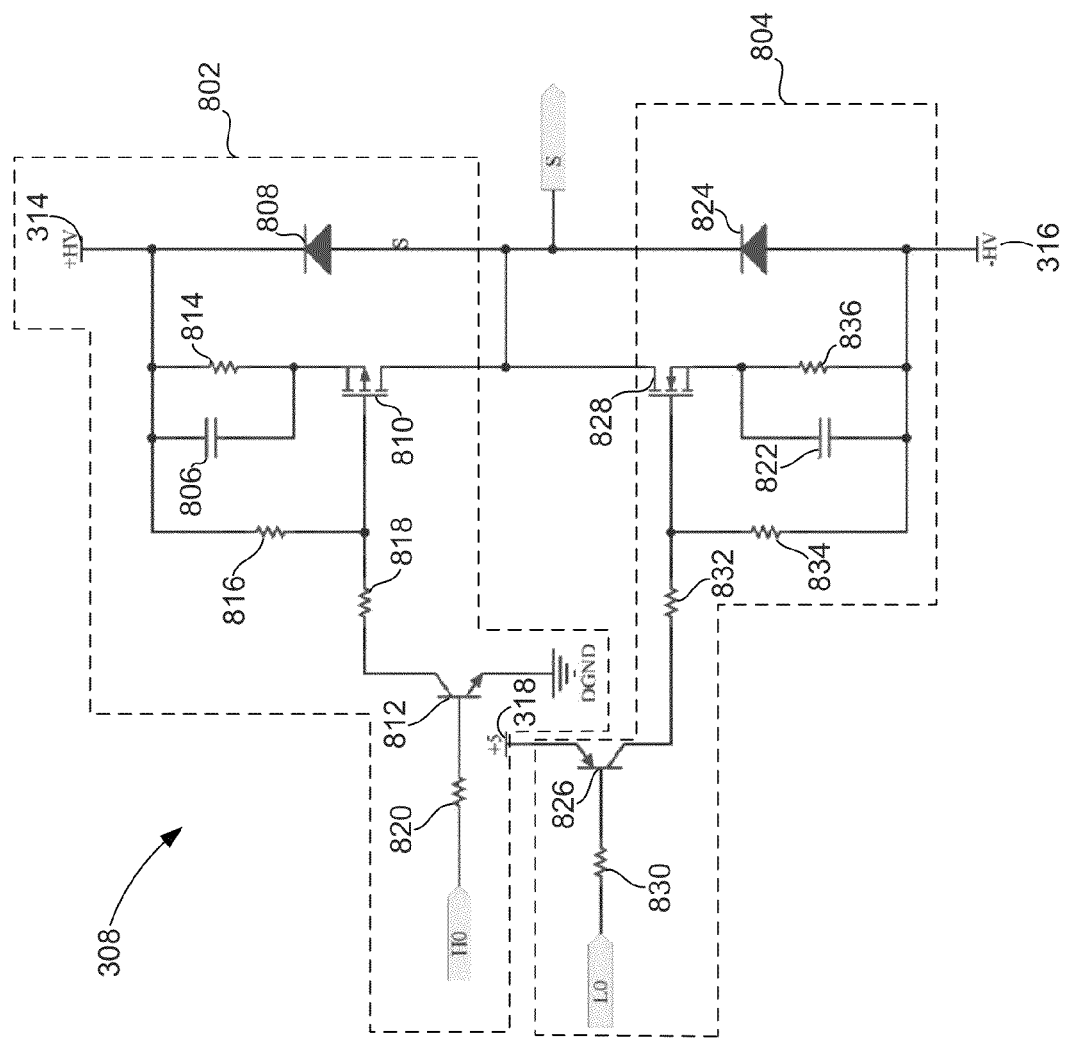
FIG. 8 is a circuit diagram of the segment driver of FIG. 3 in accordance with an embodiment.

Reference is now made to FIG. 8, in which a segment driver 308 in accordance with an embodiment is illustrated. As described above, each electroluminescent segment 100a and 100b can be considered a capacitor with a capacitance of γA. The purpose of the segment driver 308 is to quickly discharge and recharge the capacitor. Light is emitted during the discharge which typically lasts from about 100 ns to a few micro seconds. As described above, the rate at which the discharge and recharge is repeated is referred to as the frequency f.

The segment driver 308 receives three DC voltage signals (the positive voltage rail 314, the negative voltage rail 316 and a digital voltage signal 318) from the power module 310, two control signals (a high control signal and a low control signal) from the control unit 312, and generates the series of positive and negative pulses shown in FIGS. 4 and 5. In the embodiment shown in FIG. 8, the segment driver 308 comprises a high-side circuit 802 for generating the positive pulses, and a complementary low-side circuit 804 for generating the negative pulses.

The high-side circuit 802 comprises a capacitor 806, a diode 808, two transistors 810 and 812 and four resistors 814, 816, 818 and 820. When the high control signal is enabled (by the control unit 312), the second transistor 812 conducts through the voltage divider formed by the second and third resistors 816 and 818, raising the gate of the first transistor 810 to a percentage of the positive voltage rail 314. Specifically, the voltage divider formed by the second and third resistors 816 and 818 raises the gate of the first transistor 810 to $R_{818}/(R_{816}+R_{818})$*Positive Voltage Rail 314 where $R_{816}$ is the resistance of the second resistor 816 and $R_{818}$ is the resistance of the third resistor 818. For example, where the second and third resistors 816 and 818 have resistances of 3.9 KΩ and 18 KΩ respectively and the positive voltage rail is 80 V, the gate of the first transistor 810 will be roughly 65 V, or 15 V below the positive voltage rail 314.

Initially, the first transistor 810 acts as a saturated switch, passing a transient current spike (referred to as the "spike") through the first capacitor 806. The spike time can be calculated by solving the current-time profile of a capacitor (the electroluminescent segment capacitor) discharging into another capacitor (the segment driver capacitor) through a resistor (the resistance of the current path). This model results in a system of two simultaneous linear differential equations that is readily solvable, and leads to the solution shown in equation (20) where $V_S$ is the voltage of the electroluminescent segment 100a or 100b, $V_0$ is the positive voltage rail 314, $C_S$ is the capacitance of the electroluminescent segment 100a or 100b, $C_2$ is the capacitance of the first capacitor 806, and R is the total resistance (including parasitic resistance $R_p$) of the electroluminescent segment's 100a or 100b current path.

$$\frac{V_S(t)}{V_0} = 1 + \frac{C_2}{C_S + C_2}\left[e^{\frac{C_S+C_2}{C_S C_2 R}(-t)-1}\right] \quad (20)$$

In one embodiment, the spike time $t_s$ is defined as the point where the electroluminescent segment 100a or 100b is 95% discharged. Under these conditions, equation (20) reduces to equation (21).

$$t_S = \frac{C_S C_2 R}{C_S + C_2} \ln \frac{C_2}{0.05 C_2 - 0.95 C_S} \quad (21)$$

After the current spike, any residual current drawn by the load passes through the first resistor 814. At heavy loads the first resistor 814 limits the current through the first transistor 810 to a predetermined level (i.e. 160 mA). At light loads, the first transistor 810 acts as a saturated switch.

During the second half of the cycle, the first transistor 810 is cut off and the first capacitor 806 discharges through the first resistor 814. The resistance of the first resistor 814 is selected so that the first capacitor 806 is fully discharged before the start of the next cycle.

The low-side circuit 804 is a mirror image of the high-side circuit 802. Specifically, the low-side circuit 804 comprises a capacitor 822, a diode 824, two transistors 826 and 828 and four resistors 830, 832, 834 and 836. When the low control signal is enabled (by the control unit 312), the third transistor 826 conducts through the voltage divider formed by the sixth and seventh resistors 832 and 834, raising the gate of the fourth transistor 828 to a percentage of the negative voltage rail 316. Specifically, the voltage divider formed by the sixth and seventh resistors 832 and 834 raises the gate of the fourth transistor 828 to $R_{832}/(R_{832}+R_{834})$*Negative Voltage Rail 316 where $R_{832}$ is the resistance of the sixth resistor 832 and $R_{834}$ is the resistance of the seventh resistor 834. For example, where the sixth and seventh resistors 832 and 834 have resistances of 18 KΩ and 3.9 KΩ respectively and the negative voltage rail is −80 V, the gate of fourth transistor 828 will be roughly −65 V, or 15 V above the negative voltage rail 316.

Initially, the fourth transistor 828 acts as a saturated switch, passing a transient current spike (referred to as the "spike") through the second capacitor 822. The spike time can be generated from equation (21).

After the current spike, any residual current drawn by the load passes through the eighth resistor 836. At heavy loads the eighth resistor 836 limits the current through the fourth transistor 828 to a predetermined level (i.e. 160 mA). At light loads, the fourth transistor 828 acts as a saturated switch.

During the subsequent first half of the next cycle, the fourth transistor 828 is cut off and the second capacitor 822 discharges through the eighth resistor 836. The resistance of the eighth resistor 836 is selected so that the second capacitor 822 is fully discharged before the start of the second half of the subsequent cycle.

In one embodiment, the components of the segment driver 308 have the values and types as set out in Table 3.

TABLE 3

| Element | Type | Value/Part Number |
|---|---|---|
| 806 | Capacitor | 0.68 μF 100 V |
| 808 | Diode | RF071M2STR |
| 810 | P-Channel MOSFET | ZVP4424 |
| 812 | NPN Bipolar Transistor | MMST5551 |
| 814 | Resistor | 85R ½ W |
| 816 | Resistor | 3.9 KΩ |
| 818 | Resistor | 18 KΩ |
| 820 | Resistor | 5.1 KΩ |
| 822 | Capacitor | 0.68 μF 100 V |
| 824 | Diode | RF071M2STR |
| 826 | N-Channel MOSFET | ZVN4424 |
| 828 | PNP Bipolar Transistor | MMST5401 |
| 830 | Resistor | 5.1 KΩ |
| 832 | Resistor | 18 KΩ |
| 834 | Resistor | 3.9 KΩ |
| 836 | Resistor | 85R ½ W |

Figure 9:
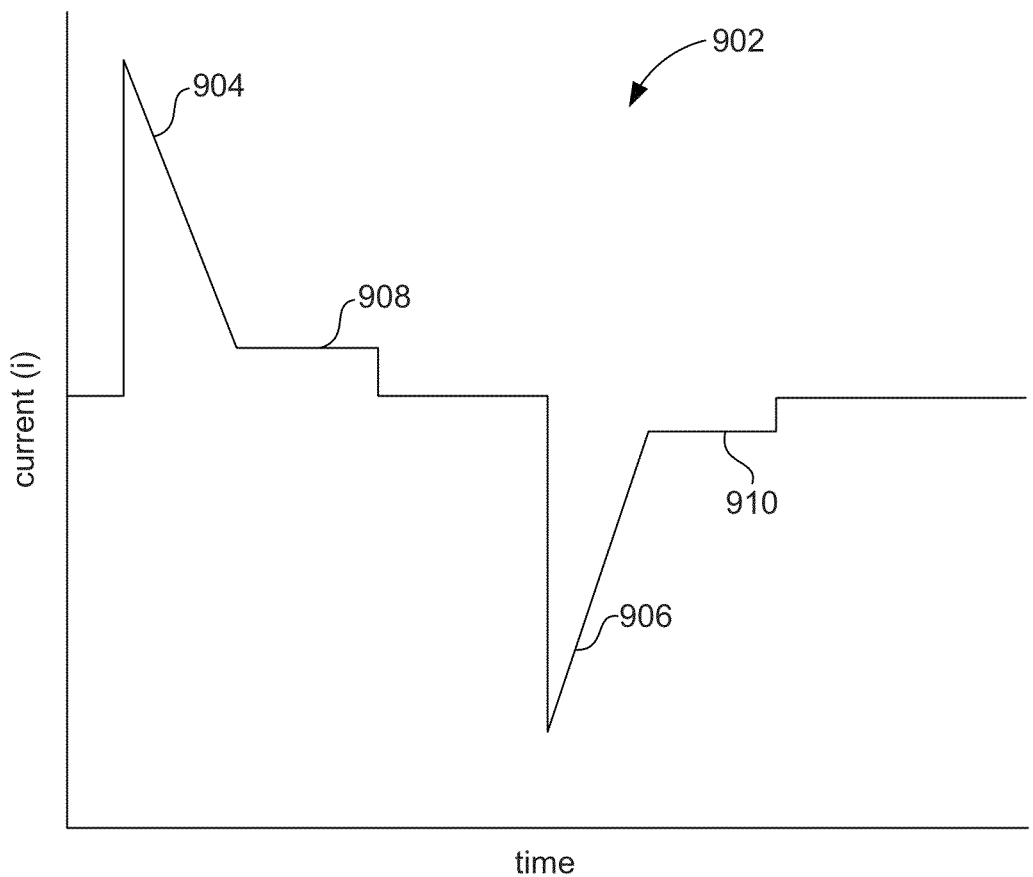
FIG. 9 is a schematic of the current waveform of the segment driver of FIG. 8 in accordance with an embodiment.

Reference is now made to FIG. 9, which illustrates the current profile 902 of the segment driver 308 of FIG. 8. It can be seen from FIG. 9 that during each half cycle there is a current spike 904, 906 and a current limited period 908, 910. The first current spike 904 and the first current limited period 908 are generated by the high-side circuit 802 of FIG. 8 and the second current spike 906 and the second current limited period 910 are generated by the low-side circuit 804 of FIG. 8. As described above, during the current spike 904, 906, the corresponding electroluminescent segment 100a or 100b is discharged (causing illumination of the electroluminescent segment 100a or 100b), and during the current limited period the corresponding electroluminescent segment is charged. Although in theory the width of the segment driver pulses may be selected to be large enough to encompass the sum of the spike time and the charge time, practically the spike time is so small relative to the charge time that an acceptable pulse width can be selected based on the charge time alone.

Figure 10:
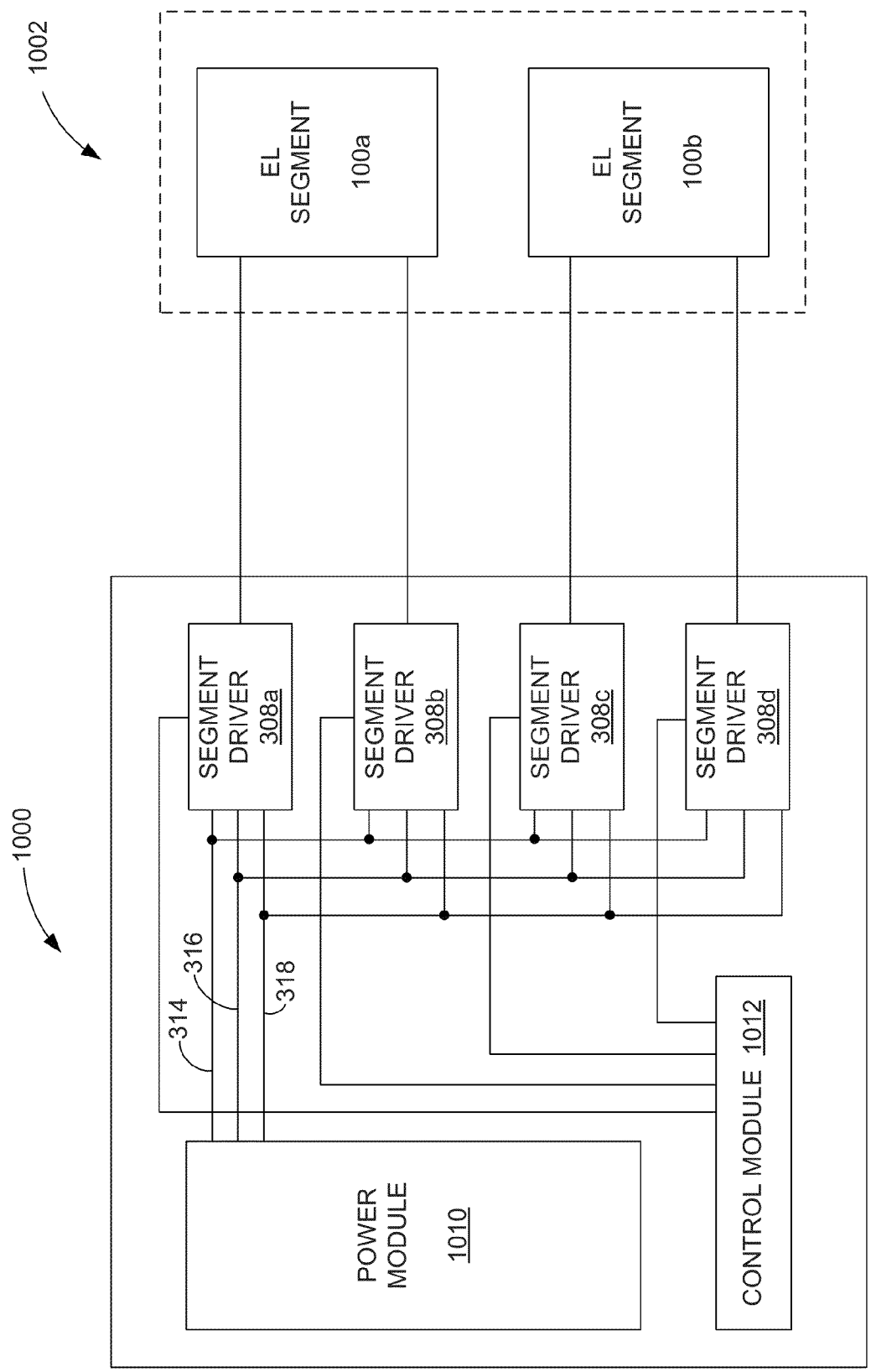
FIG. 10 is a block diagram of an apparatus for driving an electroluminescent display in accordance with an alternate embodiment.

Reference is now made to FIG. 10, in which an apparatus 1000 for driving an electroluminescent display 1002 in accordance with an alternate embodiment is illustrated. The electroluminescent display 1002 includes one or more electroluminescent segments 100a and 100b that are individually coupled to the apparatus 1000. As described above, each electroluminescent segment 100a and 100b comprises an electroluminescent substance (i.e. phosphor substance) disposed between two electrodes. In the embodiment shown in FIG. 10 (contrary to the embodiment shown in FIG. 3) there is no common electrode between the electroluminescent segments 100a and 100b. Specifically, the electrodes of each electroluminescent segment 100a and 100b are electrically isolated from those of other segments. In some embodiments, the electroluminescent segments 100a and 100b are arranged to form a matrix or grid. In other embodiments, the electroluminescent segments 100a and 100b may have other shapes and arrangements.

The apparatus 1000 comprises one or more pairs of segment drivers 1008a, 1008b, 1008c and 1008d (typically one pair for each electroluminescent segment 100a and 100b), a power module 1010 and a control unit 1012. Each pair of segment drivers works together to provide an AC voltage to one electroluminescent segment 100a or 100b. Specifically, one segment driver of each pair (i.e. segment driver 1008a or segment driver 1008c) is coupled to one electrode (i.e. front electrode) of one electroluminescent segment 100a or 100b to provide a voltage to the electrode (i.e. front electrode). The other segment driver of the pair (i.e. segment driver 1008b or segment driver 1008d) is coupled to the other electrode (i.e. back electrode) of the electroluminescent segment 100a or 100b to provide a complementary voltage to the other electrode (i.e. back electrode).

The segments drivers 1008a, 1008b, 1008c, and 1008d typically operate in the same manner as the segment drivers 308a and 308b described above. Specifically, each segment driver 1008a, 1008b, 1008c, and 1008d generates a series of pulses of alternating polarity. Typically, the width of the pulses for each pair of segment drivers is the same. Similar to the embodiment described in relation to FIG. 3, the pulse width required to achieve the maximum luminescence may be calculated from the parasitic resistance $R_\rho$ using equation (18). In this embodiment, dimming or brightness may be controlled by decreasing the segment driver pulse width below the pulse width required to achieve the maximum luminescence. Typically, the shorter the pulse width, the less bright (or more dim) the illumination, and the wider the pulse width (up to the pulse width calculated from equation (18)) the brighter the illumination.

The power module 1010 and the control unit 1012 typically operate in the same manner as power module 310 and control unit 312 of FIG. 3 respectively.

Figure 11:
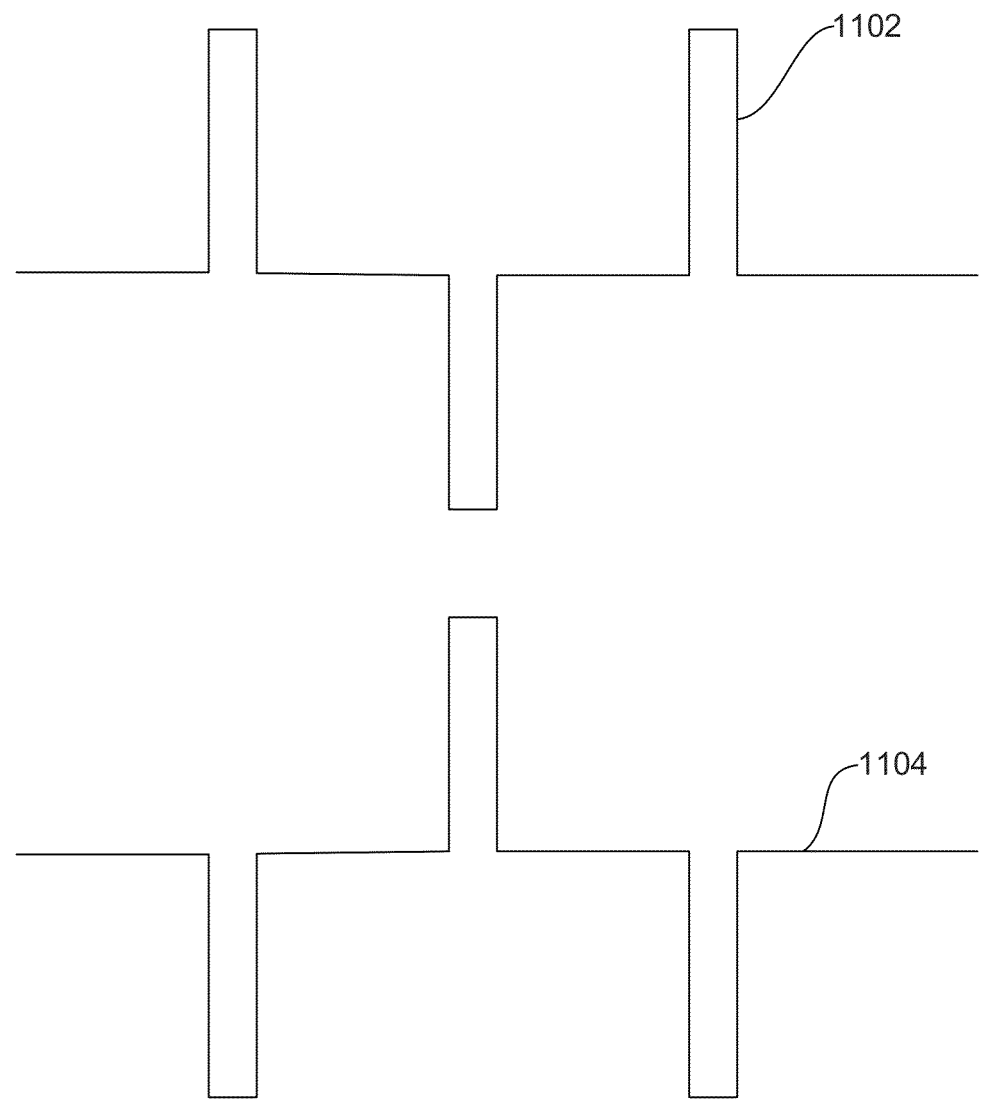
FIG. 11 is a schematic of the voltage waveform generated by a pair of segment drivers of FIG. 10 in accordance with an embodiment.

Reference is now made to FIG. 11, which illustrates the voltage waveforms 1102 and 1104 generated by a pair of segment drivers 1108a or 1108b, respectively in accordance with an embodiment. As can be seen from FIG. 11, the segment drivers 1008a and 1008b supply complementary pulses of the same width to the two electrodes (i.e. front and rear electrode) of an electroluminescent segment 100a or 100b. Each pair of corresponding pulses generates a voltage potential across the corresponding electroluminescent segment 100a or 100b, which causes a discharge and then subsequent recharge of the electroluminescent segment 100a or 100b. Light is emitted by the corresponding electroluminescent segment 100a or 100b during the discharge. The brightness of the illumination may be controlled by shortening or lengthening the pulse width. Typically a shorter pulse width will generate less illumination (i.e. the illumination will be less bright), and a longer pulse width will generate more illumination (i.e. the illumination will be brighter).

The present invention has been described here by way of example only. Various modifications and variations may be made to these exemplary embodiments without departing from the spirit and scope of the invention, which is limited only by the appended claims.

We claim:

1. A method of driving an electroluminescent segment, the electroluminescent segment comprising a phosphor layer disposed between a first electrode and a second electrode, the electroluminescent segment being associated with a parasitic resistance, the method comprising:
    applying a series of first pulses to the first electrode, the first pulses alternating in polarity; and
    applying a series of second pulses to the second electrode for illuminating the electroluminescent segment, each of the second pulses corresponding to a first pulse and having an opposite polarity to the corresponding first pulse, the width of each of the second pulses being based on the parasitic resistance associated with the electroluminescent segment;
    wherein the width of each of the second pulses controls a charge time of the electroluminescent segment, a maximum charge time being equal to:

$$\frac{3\gamma A}{\rho A + R_p}$$

wherein $\gamma$ is the electric permittivity of the electroluminescent segment, A is the area of the electroluminescent segment, $\rho$ is the electrical resistivity of the electroluminescent segment and $R_\rho$ is the parasitic resistance.

2. The method of claim 1, wherein the series of first pulses form a square waveform.

3. The method of claim 1 or 2, wherein each of the first pulses forms a ramping waveform, and the first pulses alternate between ascending ramps and descending ramps.

4. The method of claim 1, wherein each of the second pulses are aligned with a specific ramp level of the corresponding first pulse to illuminate the electroluminescent segment at a predetermined brightness.

5. The method of claim 1, wherein the width of each of the first pulses is the same as the width of the corresponding second pulse.

6. The method of claim 1, wherein each of the second pulses discharges and re-charges the electroluminescent segment.

7. The method of claim 1, wherein the parasitic resistance comprises current resistance, segment lead resistance, and cable resistance.

8. An apparatus for driving an electroluminescent segment, the electroluminescent segment comprising a phosphor layer disposed between a first electrode and a second electrode, the electroluminescent segment being associated with a parasitic resistance, the apparatus comprising:
    a first drive circuit for applying a series of first pulses to the first electrode, the first pulses alternating in polarity; and
    a second drive circuit for applying a series of second pulses to the second electrode for illuminating the electroluminescent segment, each of the second pulses corresponding to one of the first pulses and having an opposite polarity to the corresponding first pulse, the width of the second pulses being based on the parasitic resistance associated with the electroluminescent segment;
    wherein the width of each of the second pulses controls a charge time of the electroluminescent segment, a maximum charge time being equal to:

$$\frac{3\gamma A}{\rho A + R_p}$$

wherein $\gamma$ is the electric permittivity of the electroluminescent segment, A is the area of the electroluminescent segment, $\rho$ is the electrical resistivity of the electroluminescent segment and $R_\rho$ is the parasitic resistance.

9. The apparatus of claim 8, wherein the series of first pulses form a square waveform.

10. The apparatus of claim 8 or 9, wherein each of the first pulses forms a ramping waveform, and the first pulses alternate between ascending ramping waveforms and descending ramping waveforms.

11. The apparatus of claim 8, wherein the second drive circuit aligns each of the second pulses with a specific ramp level of the corresponding first pulse in accordance with a dimming control signal, and the apparatus further comprises a control unit for generating the dimming control signal.

12. The apparatus of claim 8, wherein the width of the second pulses are varied by the second drive circuit in accordance with a pulse width control signal; and the apparatus further comprises a control circuit for generating the pulse width control signal.

13. The apparatus of claim 8, wherein the width of each of the second pulses controls the brightness of the illumination of the electroluminescent segment.

14. The apparatus of claim 8, wherein the second drive circuit provides a current spike to the second electrode during a first portion of each second pulse and provides a constant current to the second electrode during a second portion of each second pulse.

15. The apparatus of claim 8, wherein the width of each of the first pulses is the same as the width of the corresponding second pulse.

16. An electroluminescent display comprising:
a plurality of electroluminescent segments, each electroluminescent segment comprising a phosphor layer disposed between a first electrode and a second electrode, each electroluminescent segment being associated with a parasitic resistance;
a plurality of first drive circuits, each first drive circuit coupled to one of the plurality of first electrodes, each first drive circuit applying a series of first pulses to the corresponding first electrode, the first pulses alternating in polarity; and
a plurality of second drive circuits, each second drive circuit coupled to one of the plurality of second electrodes, each second drive circuit applying a series of second pulses to the corresponding second electrode for illuminating the corresponding electroluminescent segment, each of the second pulses corresponding to one of the first pulses and having an opposite polarity to the corresponding first pulse, the width of the second pulses being based on the parasitic resistance associated with the corresponding electroluminescent segment;
wherein the width of each of the second pulses controls a charge time of the electroluminescent segment, a maximum charge time being equal to:

$$\frac{3\gamma A}{\rho A + R_p}$$

wherein $\gamma$ is the electric permittivity of the electroluminescent segment, A is the area of the electroluminescent segment, $\rho$ is the electrical resistivity of the electroluminescent segment and $R_\rho$ is the parasitic resistance.

17. The electroluminescent display of claim 16, further comprising a control unit for generating a plurality of pulse width control signals, wherein each of the second drive circuits varies the width of the corresponding second pulses in accordance with one of the pulse width control signals.

18. The electroluminescent display of claim 16 or 17, wherein the width of each series of second pulses controls the brightness of the illumination of the corresponding electroluminescent segment.

19. An electroluminescent display comprising:
a common electrode;
a plurality of electroluminescent segments mounted on the common electrode, each segment comprising a segment electrode and a phosphor layer disposed between the common electrode and the segment electrode, each electroluminescent segment being associated with a parasitic resistance;
a first drive circuit coupled to the common electrode, the first drive circuit applying a series of first pulses to the common electrode, the first pulses alternating in polarity; and
a plurality of second drive circuits, each second drive circuit coupled to one of the plurality of second electrodes, each second drive circuit applying a series of second pulses to the corresponding second electrode for illuminating the corresponding electroluminescent segment, each of the second pulses corresponding to one of the first pulses and having an opposite polarity to the corresponding first pulse, the width of the second pulses being based on the parasitic resistance associated with the corresponding electroluminescent segment;
wherein the width of each of the second pulses controls a charge time of the electroluminescent segment, a maximum charge time being equal to:

$$\frac{3\gamma A}{\rho A + R_p}$$

wherein $\gamma$ is the electric permittivity of the electroluminescent segment, A is the area of the electroluminescent segment, $\rho$ is the electrical resistivity of the electroluminescent segment and $R_\rho$ is the parasitic resistance.

20. A method of driving an electroluminescent segment, the electroluminescent segment comprising a phosphor layer disposed between first and second electrodes, the method comprising:
measuring intrinsic properties of the electroluminescent segment;
measuring parasitic resistance associated with the electroluminescent segment;
calculating a charge time for the electroluminescent segment based on the intrinsic properties and the parasitic resistance;
storing the calculated charge time in memory;
applying a series of first pulses to the first electrode, the first pulses alternating in polarity; and
applying a series of second pulses to the second electrode for illuminating the electroluminescent segment, each second pulse corresponding to one of the first pulses and having an opposite polarity to the corresponding first pulse, the width of the second pulses being based on the stored charge time;
wherein the width of each of the second pulses controls a charge time of the electroluminescent segment, a maximum charge time being equal to:

$$\frac{3\gamma A}{\rho A + R_p}$$

wherein $\gamma$ is the electric permittivity of the electroluminescent segment, A is the area of the electroluminescent segment, $\rho$ is the electrical resistivity of the electroluminescent segment and $R_\rho$ is the parasitic resistance.

* * * * *